United States Patent [19]

Richmond et al.

[11] Patent Number: 4,570,303
[45] Date of Patent: Feb. 18, 1986

[54] RETAINING CLIP

[75] Inventors: John F. Richmond, Hopton, England; Dieter Mauer, Lollar; Heinz O. Baum, Giessen, both of Fed. Rep. of Germany

[73] Assignee: USM Corporation, Farmington, Conn.

[21] Appl. No.: 630,711

[22] Filed: Jul. 13, 1984

[30] Foreign Application Priority Data

Jul. 15, 1983 [DE] Fed. Rep. of Germany ....... 3325686

[51] Int. Cl.⁴ ..................... B65D 63/06; F16B 13/04
[52] U.S. Cl. ............................ 24/16 PB; 24/17 AP;
24/30.5 P; 24/621; 411/83; 411/437
[58] Field of Search ........... 24/16 PB, 17 AP, 30.5 P,
24/621; 411/437, 83; 248/74.3

[56] References Cited

U.S. PATENT DOCUMENTS

| 3,118,200 | 1/1964 | Bell | 24/16 PB |
|---|---|---|---|
| 3,395,602 | 8/1968 | Strange | 411/437 |
| 3,548,463 | 12/1970 | Kohke | 24/16 PB |
| 3,728,761 | 4/1973 | Holly | 411/437 |
| 3,855,670 | 12/1974 | Brudy | 24/16 PB |
| 4,185,937 | 1/1980 | Anderson | 411/83 |
| 4,281,857 | 8/1981 | Randall | 411/437 |
| 4,435,111 | 3/1984 | Mizusawa | 411/437 |
| 4,497,603 | 2/1985 | Boucher et al. | 411/437 |

FOREIGN PATENT DOCUMENTS 1475035 2/1971 Fed. Rep. of Germany .

Primary Examiner—Victor N. Sakran
Attorney, Agent, or Firm—Aubrey C. Brine

[57] ABSTRACT

A clip for releasable attachment to a stud having a screw thread or annular ribs comprises a mount, which is elliptical in cross-section and has transverse flanges on its long sides to engage the thread or ribs of the stud. Squeezing the mount by applying pressure onto the ends of its major axis forces the flanges apart and releases the clip. Such a deformation of the mount is checked by abutments at opposite ends of its major axis.

3 Claims, 5 Drawing Figures

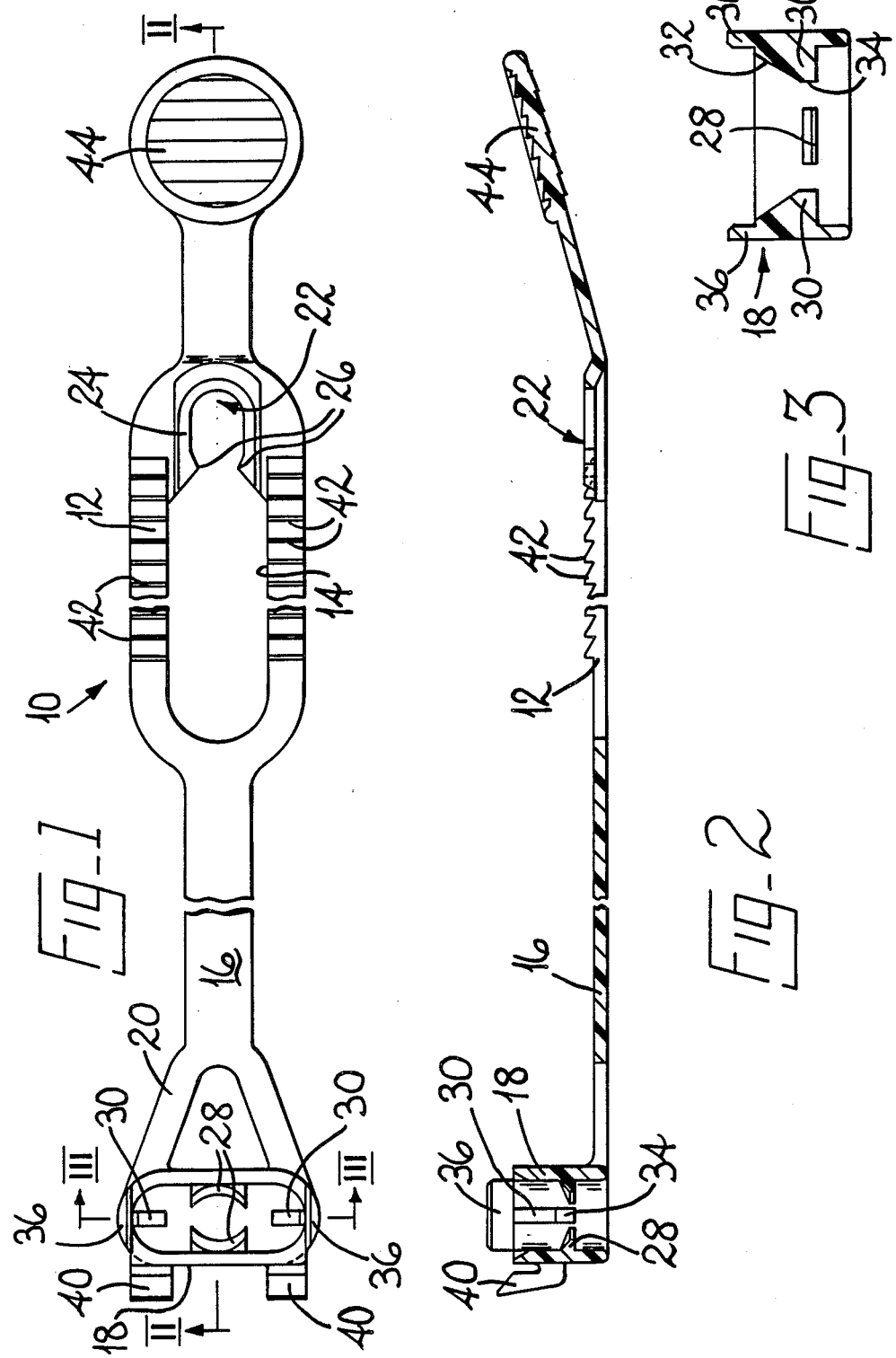

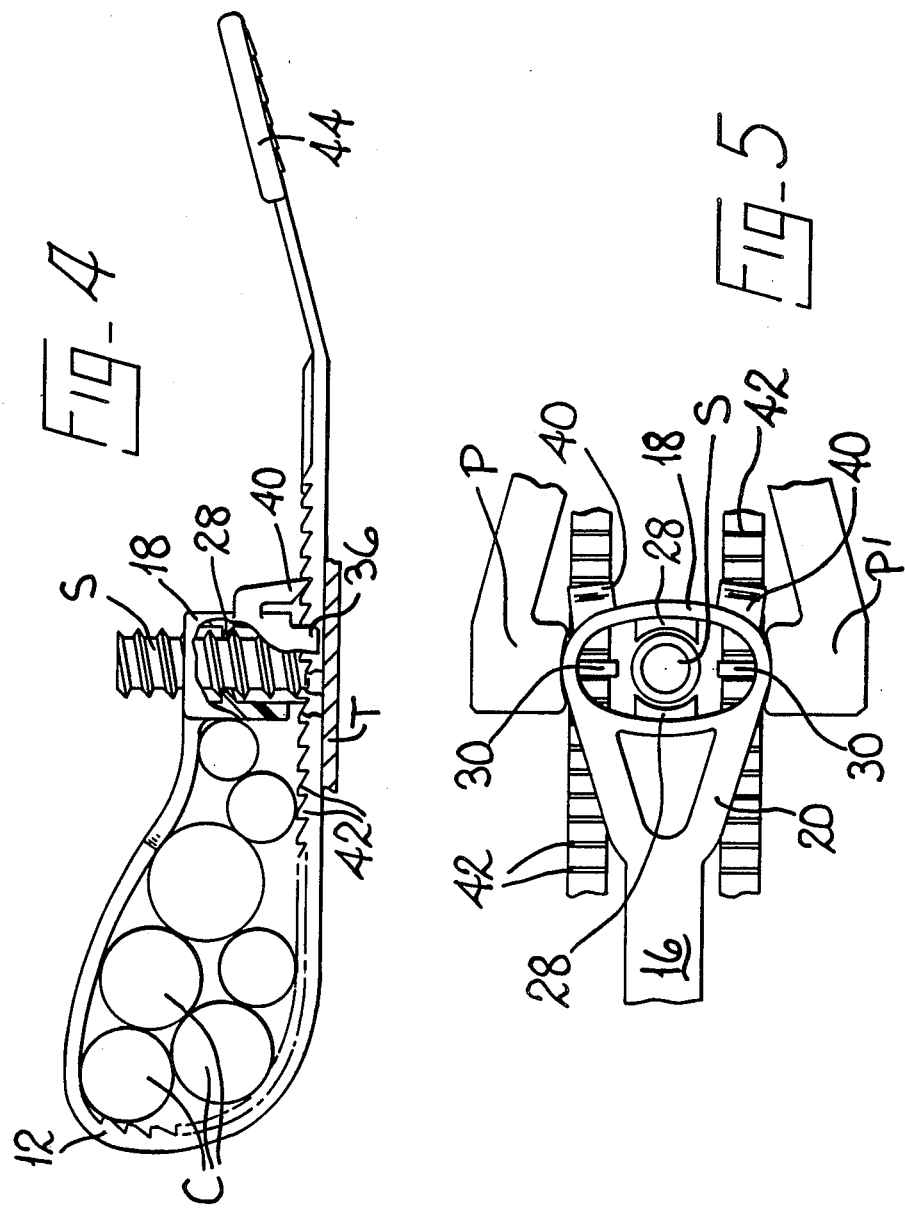

RETAINING CLIP

BACKGROUND OF THE INVENTION

The present invention relates to a retaining clip for secure engagement with a stud having a screw thread or annular ribs, comprising a mount of rigid, resilient material provided with inwardly directed transverse flanges for engagement with the thread or ribs of the stud, when the clip is pushed down onto it.

Retaining clips, which can readily be pushed onto studs having screw threads or annular ribs and are releasable more quickly than say, for example, turning a nut either on or off a screw may be used for a variety of purposes, either separately or incorporated as part of a fastener for some specific purpose. The invention described herein thus has a wide field of application. However, for a detailed description reference will be made to such a clip, which has a mount at one end of a mounting clip for cables. Such a clip described for use in securing a pipe, rather than a bundle of cables, is disclosed in the German publication DE-AS No. 14 75 035. If such a clip is used particularly for securing cables, then it might be desirable when laying out cables of electrical equipment for motor vehicles for example, to be able to secure some cables in place by means of the clip and later on to undo the clip and embrace more cables. The clip according to the aforementioned publication DE-AS No. 14 75 035 is not adapted to be released and refastened in such a way as to permit the insertion of additional cables or pipes.

It is accordingly an object of the present invention to provide an improved retaining clip for pushing onto a stud having a screw thread or annular ribs, which can readily be released and lifted off the stud.

SUMMARY OF THE INVENTION

The above object is achieved according to the invention in that the mount of the clip as referred to is designed oblong as viewed in cross-section at right angles to the axis of the stud on which it is assembled, wherein the tongues or flanges extend from the long sides of the mount at opposite ends of its minor axis, and the mount is deformable in response to pressure applied to the ends of its major axis in order to force the flanges apart and to release them from the thread or ribs of the stud.

Preferably, the flanges of the clip in accordance with the invention extend widthwise over the central portion of the mount over approximately the same length as the thickness of the stud, on which the clip is to be assembled. Abutments may extend inwardly from the mount at opposite ends of its major axis in order to ensure the position of the mount, in which the flanges are in engagement with the stud, and to limit deformation of the mount.

BRIEF DESCRIPTION OF THE DRAWING

The invention is described in detail hereafter as shown on an exemplary embodiment by means of the attached drawing in which:

FIG. 1 is a top view of the mounting clip for cables in shortened form;

FIG. 2 is a sectional view taken along the line II—II in FIG. 1;

FIG. 3 is a partial view of a mount of the clip taken along the line III—III in FIG. 1;

FIG. 4 is a side view of the clip, drawn partly in section, which embraces a bundle of cables and is secured to a threaded stud; and FIG. 5 is a top view of a mount at one end of the clip being released from the stud shown in FIG. 4.

DESCRIPTION OF THE PREFERRED EMBODIMENT

The mounting clip, as shown, is molded in one piece of a thermoplastic material which is flexible and resilient such as, for example, nylon.

It comprises a flat flexible strap 10 made up of a wide portion 12, within which is provided an oblong slot 14, and a narrow portion 16, which terminates at a socket or mount 18. The mount 18 is of elliptical cross-section with its major diameter extending transverse to the strap 10. The portion 16 of the strap is forked at 20 in order to support the ends of the mount.

At one end of the slot 14 of the strap 10 the clip has a seat 22 provided with a ledge 24 running inwardly around the slot at the end, the ledge broadening at its open end to provide a constriction 26. The ledge can be engaged into the flutes of a screw thread or between annular ribs of a bolt or stud S (FIGS. 4 and 5) and held there by the constriction 26 in order to bring about at least a temporary retention of the seat 22 on the stud S. A bundle of cables C can now be received by the strap and the mount placed over it and pushed down onto the stud S (FIG. 4).

With regard to the mount 18 as it is shown in FIG. 4, it has, when assembled on the stud S projecting upwardly from a support T, two inwardly directed transverse flanges 28 disposed centrally over the long sides of the mount, each flange being about as long as the stud S is wide or, in diameter. The flanges 28 have flat tops and sloping sides in the lower region to facilitate assembly as the mount slides down the stud in order to ensure retention by a maximum resistence to being pulled off. As shown in FIG. 3, each end of the major axis of the mount is a vertically disposed abutment 30 having a long inclined face 32 and a short vertical face 34 in order to guide the mount 18 onto the stud S and to ensure the tongues or flanges 28 (or at least one of them) engaging the thread.

Extending downwardly at each end of the mount 18 are feet 36, which, when the mount is fully pushed down onto the stud S, abut the support T leaving sufficient space between the lower edge of the the mount and the support to accommodate the wide portion 12 of the strap 10 whilst the stud locates in the seat. At that time, two pawls 40 projecting forwardly and downwardly from the mount bear resiliently on the upper side of the strap portion 12 in alignment with the margins of the strap portion at either side of the slot 14. Each of these margins is provided on its upper surface with a row of transverse teeth 42 shaped ratchet-wise for engagement with the pawls 40. Such engagement is effected after the mount has been pushed down the stud over the wide portion of the strap 10, by pulling on the extension of the strap, at the end of which is provided a tab 44, which can readily be grasped for that purpose. Facing faces of the pawls 40 and teeth 42 are inclined to facilitate the teeth riding under the pawls, whereby opposing stop faces on the opposite sides of the pawls and teeth are vertical or nearly so. Thus the strap is restrained by the pawls 40 from loosening its grip on the bundle of cables after it has been tightened.

The extension or tab 44 is circular with transversely ribbed surfaces for the fingers to get a better grip when it is to be pulled.

If it is desired to release the strap, for example to remove the mount 18 from the stud S temporarily for adding more cables to the bundle, a suitable pliers-like tool having prongs P and P' may be used to squeeze the mount 18 by applying pressure to the ends of its major diameter perpendicular to the stud axis.

As shown in FIG. 5, such squeezing results in the mount 18 being deformed to a more circular configuration, whereby the deformation is limited by the abutments 30 and the flanges 28 have been sufficiently opened out in order to disengage them from the stud.

We claim:

1. A retaining clip for secure engagement with a stud having a screw thread or annular ribs, comprising a mount of resilient material provided with inwardly directed transverse flanges for engagement with the thread or ribs of the stud when the clip is pushed down onto it, characterized in that said mount is oblong as viewed in cross-section at right angles to the axis of a stud on which it is assembled, said flanges extending from the long sides of the mount at opposite ends of its minor axis, said mount further including abutments extending inwardly therefrom at opposite ends of its major axis, said mount being deformable in response to pressure applied to the ends of its major axis such that said flanges are forced apart to thereby release them from the thread or ribs of the stud, and the abutments being effective to ensure the position of the mount in which said flanges are in engagement with the stud, and limit deformation of said mount.

2. A clip according claim 1, characterized in that said flanges extend in arch form over a central portion of said mount over approximately the same length as the thickness of the stud onto which it is engaged.

3. A clip according to claim 2 wherein each said abutments comprises a face inclined inwardly with respect to the axis of the stud and terminating at a shorter face disposed substantially parallel of the stud axis.

* * * * *